US006219666B1

(12) United States Patent
Krishnaswamy et al.

(10) Patent No.: US 6,219,666 B1
(45) Date of Patent: Apr. 17, 2001

(54) AUTONOMOUS TRANSACTIONS IN A DATABASE SYSTEM

(75) Inventors: Janaki Krishnaswamy, Redwood Shores; Kannan Muthukkaruppan, Foster City, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/114,340

(22) Filed: Jul. 13, 1998

(51) Int. Cl.[7] ....................................... G06F 17/30
(52) U.S. Cl. ............................. 707/8; 707/103; 707/200; 707/202
(58) Field of Search .................... 707/103, 200, 707/202, 8; 705/52, 54, 80; 713/187, 200; 711/212; 703/6, 13

(56) References Cited

U.S. PATENT DOCUMENTS

| | | | |
|---|---|---|---|
| 5,815,415 | * | 9/1998 | Bentley et al. ........................... 703/4 |
| 5,987,242 | * | 11/1999 | Bentley et al. ........................ 703/13 |
| 6,014,674 | * | 1/2000 | McCargar ............................. 707/202 |
| 6,063,128 | * | 5/2000 | Bentley et al. ........................... 703/6 |

OTHER PUBLICATIONS

IEEE publication, "Heterogeneous and autonomous transaction processing", by Pu et al., Dept. of Computer Science, Columbia University, N.Y., vol. 124, issue 12, pp. 64–72, Dec. 1991.*

IEEE publication, "Autonomous transaction execution with epsilon serializability", by Pu et al. Dept. of Computer Science, Columbia University, NY, pp. 2–11, Feb. 1992.*

* cited by examiner

Primary Examiner—Paul R. Lintz
Assistant Examiner—Diane D. Mizrahi
(74) Attorney, Agent, or Firm—Hickman, Palermo, Truong & Becker LLP; Brian D. Hickman

(57) ABSTRACT

A method is disclosed that involves establishing a transaction stack in a memory of a computing system that is processing transactions. Two commands, PUSH and POP, operate on the stack. The PUSH command causes a frame of data identifying the currently executing transaction to be pushed onto the transaction stack. After a PUSH is executed, the first transactional statement that executes causes creation of a new autonomous transaction. If another transactional statement is executed after the new transaction commits or rolls back, but before a POP is executed, then another new autonomous transaction is created. A POP operation restores the transaction identified by the top frame of the stack. In another aspect, a programming language construct is provided for associating a lexical scope with an autonomous transaction scope. When the lexical scope is first entered during execution of the program in a first transaction, the transaction context of the first transaction is stored on a transaction stack. The operations in the lexical scope are executed in one or more autonomous transactions. When the lexical scope is exited, the transaction context on the top of the transaction stack is restored as the current transaction context. The stack automatically keeps track of nested sequences of autonomous transactions. Further, deadlocks are rapidly detected.

28 Claims, 12 Drawing Sheets

AUTONOMOUS TRANSACTIONS IN A DATABASE SYSTEM

FIELD OF THE INVENTION

The present invention generally relates to database servers. The invention relates more particularly to managing transactions in application programs that interact with databases.

BACKGROUND OF THE INVENTION

Modern database servers provide facilities for organizing activities of application programs that use the database servers into logical transactions. Generally, when an application program initiates a particular transaction, it cannot carry out database operations outside the transaction until the transaction commits and completes, unless the application program logically separates the current transaction and establishes a new transaction. In the past, such logical separation has required the use of explicit programming language statements such as "detach" and "attach." These statements require the programmer, as the program is being written, to keep track of which transaction is current.

In some situations during the execution of a particular transaction, it is necessary to be able to carry out one or more operations that are outside the scope of the particular transaction. For example, consider a transaction having a long duration that periodically stores debugging information in a database table. Normally, storage actions of a transaction, such as changes to database tables, are not "committed" or made permanent if the transaction aborts or fails abnormally. However, in this example, it is important for the operations that involve storage of information in the debug table to be committed even, or especially, when the transaction aborts. In other words, the debug table storage operations should be carried out in an independent or "autonomous" transaction.

As another example, in certain financial applications, such as an accounting application, it is useful to have a mechanism to create, store, and commit account code information without giving consideration to the outcome of the transaction that is the source of a need to create an account code. Consider another example involving an application having transactions that call an audit log transaction that creates an audit log file. It is desirable to retain the audit log file even if the calling transaction fails, because the audit information might be useful in showing what went wrong.

In one past approach, an autonomous transaction is managed using transaction commands for attaching and detaching transactions. This approach is used, for example, in the Oracle C Interface (OCI) for the Oracle8® database system. As an example, if the long-duration transaction described in the above example is named "trans 1," the following program code could provide transaction independence:

```
execute trans1
detach
attach (trans2)
{execute some statements that store debug information}
commit        /* commits changes made to the debug table */
attach (trans 1)
{resume execution of trans1}
commit        /* commits changes made by trans1 */
```

However, this approach suffers from several drawbacks, including the following. First, the approach is error-prone, since the programmer must, after each "detach" command, specify the correct transaction to be attached. This requirement can cause errors in situations involving long, nested sequences of independent transactions. For example, the requirement of matching transaction names is unwieldy in code in which one transaction calls another transaction that calls yet another transaction.

Second, in the above approach, certain deadlock situations may become impossible to detect. For example, if in the above example the transaction trans1 holds a particular resource (e.g., a table lock) that is required by trans2, a deadlock situation would occur. A deadlock arises because transl cannot complete and release the resource until trans2 completes, which can't complete until transl releases the resource. Generally, a database server will not detect such a deadlock, because in general, to the database server trans1 and trans2 appear as independent transactions and it cannot assume that trans1 will not resume before trans2 completes. For example, the application could be multi-threaded, switching between trans1 and trans2 in successive fixed processing time intervals.

Traditional transaction processing mechanisms also present problems when two or more transactions are nested in a parent transaction, child transaction relationship. In past approaches, if the parent transaction aborts processing, the server causes all the child transactions to spontaneously abort. This is deemed necessary to ensure data consistency. However, in certain contexts it is important for a child transaction to be autonomous, so that if the child transaction completes without error it can commit, regardless of whether the parent transaction commits.

In some past approaches, recursive transaction support is provided. A recursive transaction is a separate, system-level transaction having no dependencies upon a parent transaction or child transaction upon commit. Such support is available in the Oracle® database server commercially available from Oracle Corporation, Redwood Shores, Calif. Recursive transactions are independent transactions that can be invoked only by Oracle database server. Recursive transactions do not support user savepoints and serializability. There is no concept of a recursive transaction scope. Users of recursive transactions, internal to the Oracle database servers, must explicitly start and end the recursive transactions, which could lead to programmatic errors.

Based on the foregoing, there is a clear need for a mechanism that facilitates the initiation and completion of autonomous transactions.

In particular, there is a need to provide a mechanism that enables an application program to have reusable application sub-components that perform specialized transactional operations. There is also a need to make such sub-components available to calling applications, without regard to the possible transaction state of the calling application, or the eventual disposition of the transaction.

Further, there is a need for a mechanism that enables an application program to create, manage, and terminate autonomous transactions, without requiring the application program or an application programmer to track each autonomous transaction by name.

Further, there is a need for a mechanism that enables a program or process to carry out one or more autonomous transactions, in which the autonomous transaction has no dependencies with respect to a transaction that calls the autonomous transaction.

There is a need for such a mechanism in which the mechanism can be used to construct reusable sub-components of application programs. There is also a need for such a mechanism in which an application can start a top-level transaction within another top-level transaction. There is a further need for such a mechanism in which the autonomous transaction can execute in the same manner as any other top-level transaction.

There is a further need for such a mechanism in which all changes made by an autonomous transaction are committed and are visible by the calling transaction and outside the calling transaction when the autonomous transaction commits.

There is also a need for an autonomous transaction mechanism that has no arbitrary limit on the nesting level of autonomous transactions. There is another need for an autonomous transaction mechanism in which all functions of regular transactions are available within an autonomous transaction.

Still another need is a transaction processing mechanism in which a calling transaction may call other transactions without having housekeeping code that deals with the possibility that the called transaction may fail to restore the context that existed immediately before the called transaction was called.

SUMMARY OF THE INVENTION

The foregoing needs, and other needs that will become apparent from the following description, are met in the present invention, which comprises, in one aspect, a method of executing an autonomous transaction in a computer program, the method comprising the steps of executing operations of the program in a first transaction having a transaction context; calling an element of the program from the first transaction, the element having an autonomous transaction scope that is distinct from the first transaction; suspending the first transaction; executing operations of the element in one or more second transactions; exiting the element; and resuming execution of operations of the program in the first transaction. According to one feature of this aspect, the step of calling an element of the program from the first transaction comprises the steps of calling an autonomous block of the program from the first transaction, the autonomous block having a transactional scope that is distinct from the first transaction.

According to another feature, the step of calling an element of the program from the first transaction comprises the steps of calling an element of the program from the first transaction, in which the element is marked as autonomous and has a transactional scope that is distinct from the first transaction. In yet another feature, the step of executing operations of the element in one or more second transactions comprises the steps of executing operations of the element in one or more second transactions, wherein the second transactions are autonomous and have transactional contexts that are distinct from the first transaction.

Another feature is that the step of calling an element of the program from the first transaction comprises the steps of calling an element of the program from the first transaction, in which the element is marked as autonomous and has a transactional scope that is distinct from the first transaction; and in which the step of executing operations of the element comprises the steps of executing operations of the element in one or more autonomous transactions.

In another feature, there are the further steps of generating an error condition, when the element is exited normally, if at least one of the second transactions has neither committed nor rolled back. A related feature involves the steps of when the error condition occurs, rolling back each of the second transactions that is active. Still another feature is that the step of suspending the first transaction includes the steps of pushing the transaction context of the first transaction onto a stack; and the step of resuming execution includes the steps of popping the transaction context of the first transaction from the stack.

According to another aspect, the invention provides a method of compiling a called program element that is marked as having an autonomous transaction scope distinct from that of a calling program element, the method comprising the steps of generating program code which, when executed by a processor, suspends a first transaction that is current when the called program element is called; and generating code which, when executed by the processor, restores the first transaction context before exiting the procedure. One feature of this aspect involves the steps of generating an error condition, when the called program element is exited normally, if at least one transaction in the called program element has neither committed nor rolled back. Another related feature is the steps of when the error condition occurs, rolling back each of the transactions that is active.

According to yet another aspect, the invention provides a method of associating a lexical scope of a computer program with an autonomous transaction scope, comprising the steps of when the lexical scope is entered during execution of the program, storing a first transaction context of a current transaction on a stack of transaction context information that is accessible to the program during execution thereof; executing operations of the lexical scope in one or more autonomous transactions; and after execution of the lexical scope, removing the first transaction context from the transaction stack and restoring the first transaction context as the current transaction context.

One feature of this aspect is that the current transaction is a nested transaction. In another feature, there is the step of when the lexical scope is compiled, storing, in an executable version of the computer program, an instruction that signals the start of the autonomous scope. A related feature is the step of when the instruction is executed, storing a marker bit in a runtime stack frame associated with the lexical scope.

According to still another aspect, there is a method of managing transactions in a transaction processing system, comprising the steps of storing a stack comprising a plurality of entries, in which each entry stores information about a context of one of the transactions; marking an application program with one or more markers that signal the start of an autonomous lexical scope containing one or more transaction operations; when one of the markers is encountered when the application program is executing, storing context information about a first transaction in an entry of the stack; and initiating one or more second transactions in which the transaction operations of the autonomous lexical scope are executed.

A feature of this aspect involves, when execution of the autonomous lexical scope is complete, removing the context information about the first transaction from the stack and restoring the context information as the current transaction context. Another feature is that the first transaction is among a plurality of nested transactions. Still another feature relates to the steps of suspending the first transaction. Yet another related feature is the step of recursively calling the autonomous lexical scope within the application program.

An alternative of this aspect involves the steps of suspending the first transaction each time that the autonomous lexical scope is recursively called within the application program and executing the transaction operations of the autonomous lexical scope within the one or more second transactions.

According to yet another aspect of the invention, there is a method of executing an autonomous transaction in a computer program, the method comprising the steps of storing a transaction stack in association with the computer program; executing operations of the program in a first transaction; suspending execution of the first transaction; pushing a context associated with the first transaction onto the transaction stack; executing further operations of the program in one or more second autonomous transactions; popping the context of the first transaction from the stack; and resuming execution of the first transaction. A feature of this aspect is that the step of storing a transaction stack comprises the steps of storing a transaction stack in association with the computer program, in which the transaction stack comprises one or more frames, each frame comprising transaction context information. Another feature involves storing the transaction stack as a linked list of the frames. Still another feature relates to storing the transaction stack in association with information describing a user session. Yet another feature is storing a plurality of transaction stacks in which each transaction stack is associated with a different user session.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing autonomous transactions is described. In the following description, for the purposes of explanation, numerous specific details are set forth in order to provide a thorough understanding of the present invention. It will be apparent, however, to one skilled in the art that the present invention may be practiced without these specific details. In other instances, wellknown structures and devices are shown in block diagram form in order to avoid unnecessarily obscuring the present invention.

TRANSACTION PROCESSING CONTEXT

This document is directed, in general, to persons familiar with the use of transactions in processing database operations. However, a brief introduction to transaction processing contexts will be provided in the interest of clarity.

Figure 1:
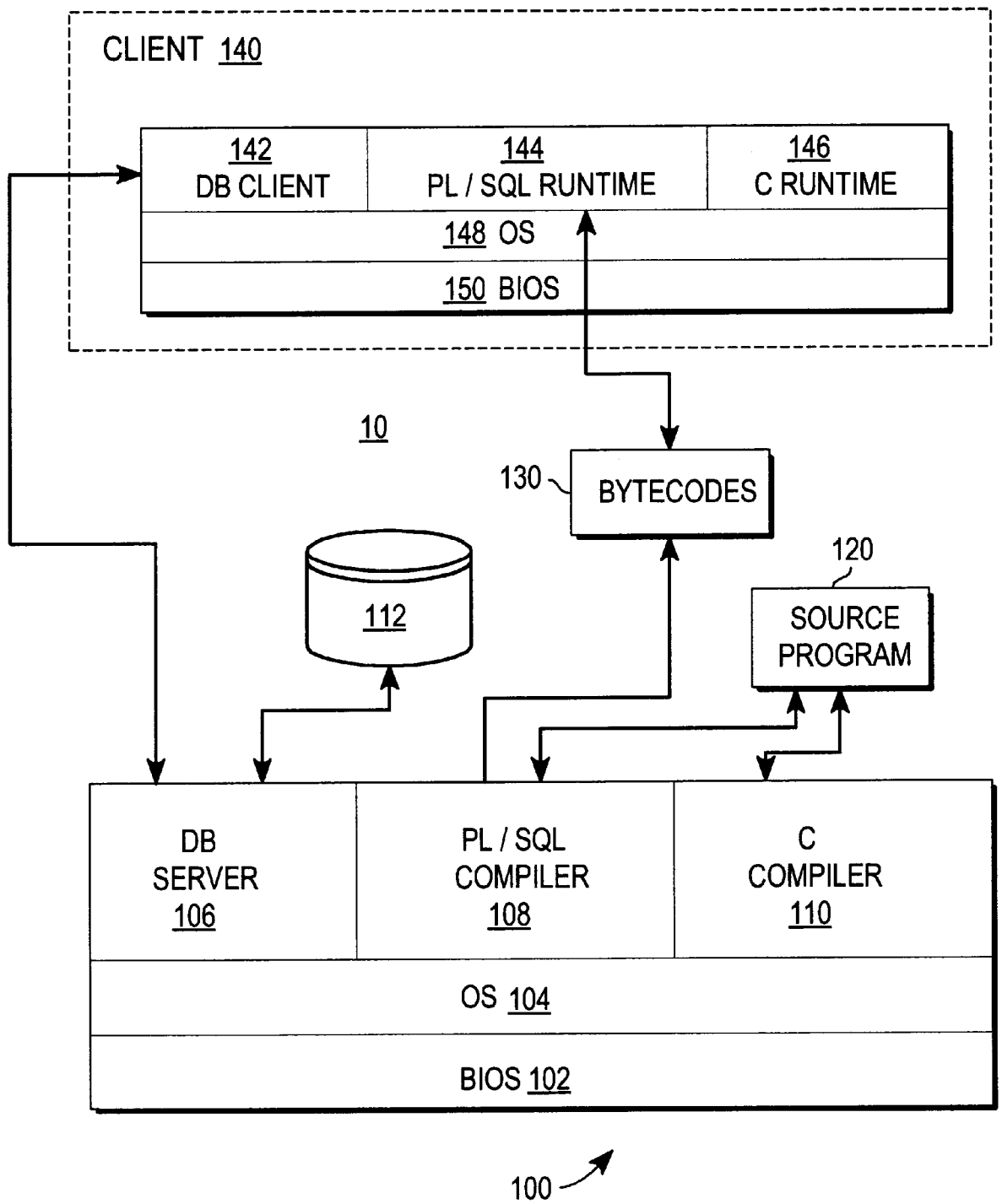
FIG. 1 is a diagram of a transaction processing system.

Generally, embodiments of the present invention are implemented in the context of a database processing system that uses transactions to organize and control database operations. FIG. 1 is a diagram of basic components of a transaction processing system 10. Generally, the system 10 comprises a server 100, a client 140, a database 112, a source program 120, and an executable program 130.

The server 100 is a general-purpose programmable computer (for example, the type shown in FIG. 6 and discussed further below) that can receive requests for resources stored on the server or accessible to the server, and deliver the resources to a requesting client 140. The server executes a basic input/output system or BIOS 102. The BIOS 102 is responsible for managing and coordinating interaction of upper level software elements with basic functions of the server 100 and hardware elements of the server. An example of BIOS 102 is the Phoenix ROM BIOS.

An operating system 104 is logically located atop the BIOS 102 and executed by the server 100. The operating system 104 is a server-class operating system such as Microsoft Windows® NT or Solaris. Optionally, the operating system 104 executes in cooperation with a network driver program that functions to coordinate interaction of the operating system and a network.

Application programs are executed by the server 100 at a logical level atop the operating system 104. In the preferred embodiment, the application programs comprise a database server 106, a PL/SQL compiler 108, and a C language compiler 110.

The database server 106 is an application program that interacts with a database 112. Generally, the functions of the database server 106 are: receiving requests for information directed to the database 112; parsing the requests and creating an execution plan for the requests, and issuing disk accesses or other commands and operations that carry out the requests. Application programs that use the database server 106 may carry out other operations such as receiving one or more results from the database, formatting the results, and delivering the formatted results to one or more other application programs. For example, the database server 106 may receive a request for information in the database in the form of a Structured Query Language (SQL) statement that identifies one or more tables in the database. The database server 106 verifies that the SQL statement has correct syntax and identifies information that is actually in the database 112. The database server 106 executes requests for disk blocks stored in the database 112 and receives a result set of records from one or more database tables.

The database 112 comprises one or more tables that store data in rows and columns. Related information is organized in a row. Columns represent values or attributes of a row. For example, a row can represent information. In a production-level database system that is used by a large business organization, the tables may comprise thousands of individual database tables.

The PL/SQL compiler 108 is a software element that can receive a source program 120 that is written in the PL/SQL language, parse the source program, generate bytecodes for the source program, and store the bytecodes in the database. At runtime, the a PL/SQL runtime engine loads the bytecodes into the address space of the database. The C compiler 110 operates in similar fashion but works with source programs that are written in the C programming language, and generates machine code rather than bytecodes.

The client 140 is a general-purpose computer system that runs a BIOS 150, OS 148, and application programs. Preferably, the application programs are a database client 142, PL/SQL runtime 144, and C runtime 146. The database client 142 communicates database information with the database server 106, organizes the information for presentation on a display of the client, and receives input from a user of the client. For example, the database client 142 receives and communicates to the database server commands that are entered by a user of the client. The database client 142 also manages data presentation tasks such as interaction with graphical user interface functions of the operating system 148.

The PL/SQL runtime 144 and the C runtime 146 manage execution of the executable program 130 on the client 140. For example, the runtimes 144, 146 contain function libraries stored in the form of bytecodes or machine code that can be called and executed by the executable program 130. Alternatively, the PL/SQL runtime 144 and C runtime 146 may be integral to the database server 106 such that autonomous blocks run in the server itself.

The server 100, database 112, and client 140 interact on a transactional basis. In typical database systems, users store, update and retrieve information by submitting commands to a database application. To be correctly processed, the commands must comply with the database language that is supported by the database application. One popular database language is known as Structured Query Language (SQL). A logical unit of work that is comprised of one or more database language statements is referred to as a transaction.

When a database system executes a transaction, the transaction may read or update a data item that was written or updated in response to the execution of previous transactions. Consequently, the results returned by the database system in response to executing any given transaction are typically dictated by changes made by a set of previously executed transactions. Generally, changes or updates are not made persistent in the database until a user instructs the transaction to "commit." Further, changes or updates can be prevented by instructing the transaction to "rollback". In certain database processing applications, certain operations, such as updates to debugging tables, are best performed outside of the scope of the transaction issuing the operations.

AUTONOMOUS TRANSACTIONS

In the preferred embodiment, within a transaction, an application program can begin an autonomous transaction, perform some database operations such as operations expressed in the Structured Query Language (SQL) statements, commit or roll back the autonomous transaction, return to the main transaction and continue with that transaction. In the context of the Oracle® database server, embodiments can provide additional transaction services for developers of functional packages that are known as "cartridges". With autonomous transaction support as provided in the preferred embodiment, an application program can begin a transaction, perform update operations and commit the transaction, all within a cartridge and separate from the transaction that invokes a function of the cartridge.

In this context, an "autonomous transaction" is a transaction that is called within another transaction. An autonomous transaction has the same properties as a regular or "flat" transaction. An autonomous transaction commits or rolls back independent of the calling transaction. Upon commit, changes made by an autonomous transaction are visible to transactions outside of the calling transaction.

Thus, in general, an autonomous transaction has the properties of a regular top-level transaction. All operations performed in an autonomous transaction are independent of any other transaction, even the transaction that started the autonomous transaction. In this context, a transaction that starts an autonomous transaction is called the "parent transaction." A transaction that is presently executing is called the "current transaction" or the "active transaction." The term "calling transaction" refers to a transaction that is active just prior to when an autonomous transaction starts or occurs. The term "called transaction" refers to an autonomous transaction that starts or occurs after a prior transaction has started.

Once an autonomous transaction is started, all further operations in the session are performed as part of the autonomous transaction until it commits or aborts. In effect, the parent transaction is suspended until the autonomous transaction is completed.

An autonomous transaction differs from a "nested transaction" in several ways. An autonomous transaction does not share resources with the parent transaction. There are no commit or rollback dependencies between a transaction and its autonomous transaction. Committed changes of a nested transaction are not visible to other transactions until the parent of the nested transaction commits. In contrast, committed changes of an autonomous transaction are immediately visible to other transactions, regardless of whether or not its calling transaction commits or rolls back.

In the preferred embodiment, an autonomous transaction also has the following properties.

1. An autonomous transaction can be used to construct reusable application program sub-components, in which a sub-component is not informed about the transaction context of the calling application. Further, an application programmer or user of a sub-component need not know about any autonomous transaction operations that the sub-component performs.

2. An application program may start a transaction within another transaction. Stored procedures and C language functions may start and complete autonomous transactions independent of the calling transaction or statement. For example, an autonomous transaction may be executed within a block of a PL/SQL application program.

3. There are no dependencies with respect to data, locks, etc., between a first transaction and an autonomous transaction called by the first transaction. The autonomous transaction is not exposed to any of the uncommitted changes made by the calling transaction, if there is one, and does not share any locks with the calling transaction.

4. An autonomous transaction is able to execute as any other transaction. It is able to execute multiple PL/SQL statements. It may commit or roll back independent of the transaction that started it. It may execute other autonomous transactions.

5. When an autonomous transaction commits, all changes made by it are committed and made visible to all other transactions, including transactions that are outside the calling transaction.

6. Changes made by an autonomous transaction are durable.

7. Programming language constructs that provide an implementation of autonomous transactions do not impose an arbitrary limit on the number of nesting levels of autonomous transactions. System-imposed limits that result from resource limitations, for example, limited main memory, may exist.

8. An autonomous transaction may carry out all functions available with regular transactions. For example, an autonomous transaction may commit, rollback, set a savepoint, and set transaction properties, such as isolation level, rollback segment, and read-only.

9. PL/SQL programs that create autonomous transactions and perform SQL operations may be invoked from a SQL context.

In the preferred embodiment, an autonomous transaction has the following properties pertaining to its transaction context. In this context, the term "transaction context" means both an abstract concept of the status and environment of a transaction, and a set of stored values or variables that reflect the status and environment of a transaction.

A PL/SQL block may be declared to be autonomous. This ensures that all database operations within the block are outside of the caller's transaction context. Such a program block is called an "autonomous transaction block." At runtime, when the autonomous transaction block is invoked, the transaction context of the caller is suspended. This ensures that operations performed in the autonomous transaction block, such as SQL operations, have no dependence or effect on the state of the caller's transaction context. The process of entering an autonomous block by itself does not begin an autonomous transaction, but only has the effect of detaching from the caller's transaction context.

Transactional operations performed in the procedural section of an autonomous block will be done as part of an autonomous transaction, that is, independent of the transaction context of the calling block. In this context, "procedural section" refers to the section of an autonomous block that is identified by "BEGIN . . . END" keywords in the PL/SQL language.

Transactional operations, if any, performed in the declaration section of an autonomous transaction block will be executed in the caller's transaction context only. This is consistent with other known programming language structures. For example, in general, an exception handler cannot trap exceptions that are raised in the declaration section of the block in which the exception handler is defined.

Autonomous blocks can invoke other autonomous blocks, or themselves recursively. In such cases, the called block does not share the transaction context of the calling block. However, when an autonomous block invokes a non-autonomous block, the called block inherits the transaction context of the calling autonomous block.

Transaction control commands in an autonomous block apply to the currently active autonomous transaction. Examples of such transaction control commands are COMMIT, ROLLBACK, SAVEPOINT, ROLLBACK TO SAVEPOINT, and SET TRANSACTION. The COMMIT and ROLLBACK statements end the currently active autonomous transaction; however, such statements do not cause control to exit the scope of the autonomous block. Subsequent operations in such scope are executed in a new autonomous transaction.

Generally, changes made by a particular autonomous transaction are visible to other transactions upon commit of the autonomous transaction. In some embodiments, where transactions run in one of two isolation modes (read-committed and serializable), the changes committed by the autonomous transaction would be immediately visible to transactions executing in read-committed mode and would also be visible to transactions executing in serializable mode that start after the autonomous transaction commits.

TRANSACTION STACK

In a preferred embodiment, a transaction processing system includes a transaction stack that is used to keep track of the order in which autonomous transactions execute.

Figure 2:
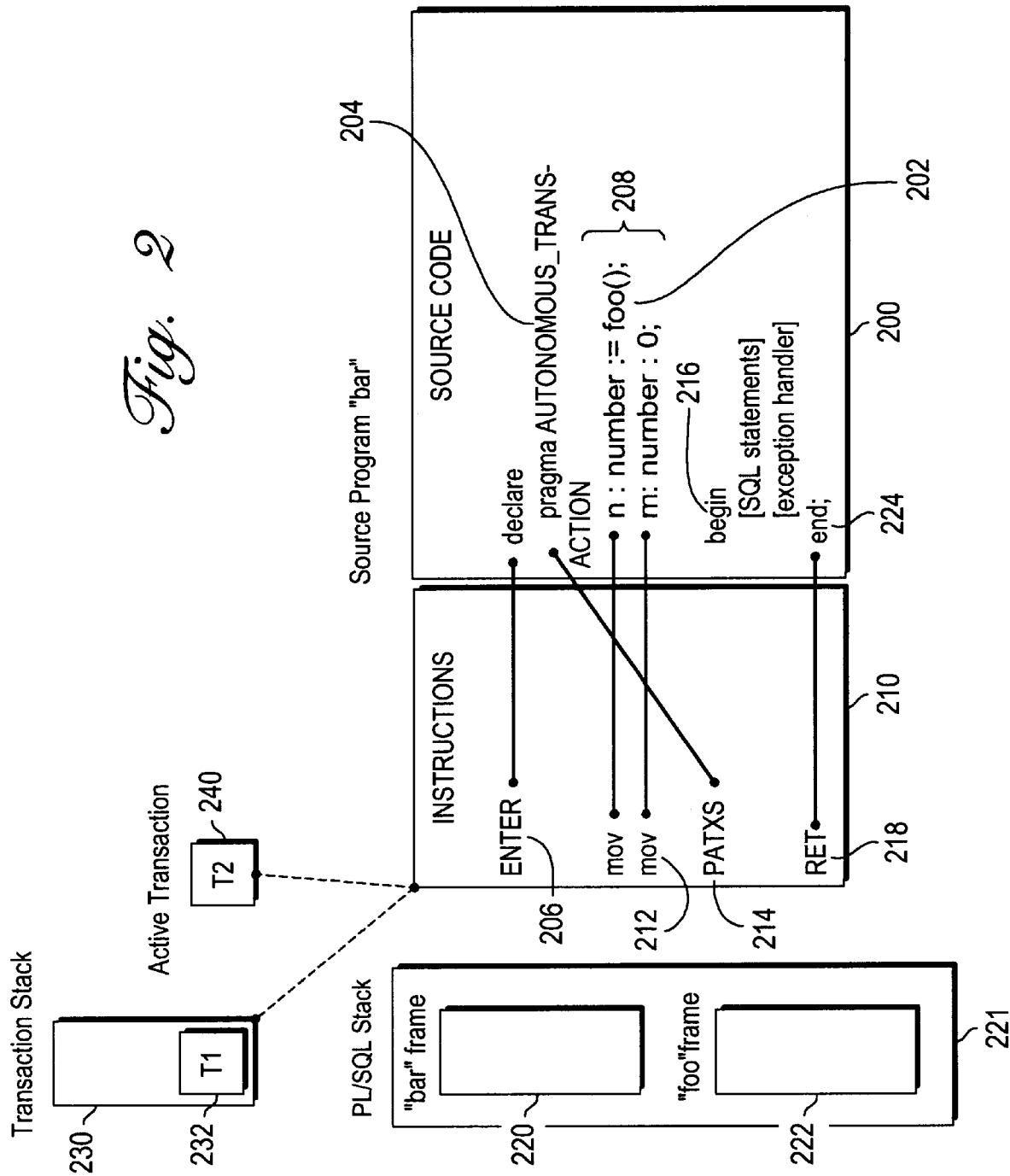
FIG. 2 is a diagram of an association of a lexical context of a program with a transaction context.

FIG. 2 is a diagram showing the relationship of a program having source code 200 and machine code 210. A transaction stack 230 is stored in association with the machine code 210 at the time the machine code executes. The stack 230 comprises one or more frames 232, each frame comprising a set of transaction context information. The set of transaction context information is generally called a "transaction context." The information contained in a transaction context is generally known to those of skill in this field, and will not be described in detail in this document to avoid obscuring the invention. The stack is structured as a linked list, array, or other suitable data structure onto which frames may be pushed and from which frames may be removed or popped. The particular structure used for the stack is not critical.

In the preferred embodiment, the transaction stack is stored in association with a user session. Thus, if there is more than one user session, there can be multiple transaction stacks. In one embodiment, the transaction stack is stored in a session state object of the database server. Generally, storing the transaction stack in the session state object is advantageous because it allows for deadlock detection between the parent transaction and autonomous transactions that it spawns, without maintaining additional information about the parent transaction waiting for the autonomous transaction to complete.

It is also desirable to store an active transaction context 240, for example, in a programmatic object designated as the active transaction context. This provides a single, central location for program elements to obtain information about the current transaction.

The transaction stack is distinct and separate from other stacks that may be maintained by a programming language compiler, runtime environment, or CPU that are used with the autonomous transaction mechanism. For example, the PL/SQL runtime 144 maintains a stack 221 having frames 220, 222 for use in connection with execution of the machine code 210. FIG. 2 shows an exemplary program named "bar" having source code 200 and corresponding machine code 210. The "bar" program contains, among other things, a function call 202 to a function named "foo". The association of statements in the source code 200 with the machine code 210 will be discussed further below.

TRANSACTION LAYER FUNCTIONS

In the preferred embodiment, a transaction layer of the database server has functions that support transaction stack operations. For example, in one embodiment, a kernel portion of the database server may have C language functions that implement transaction stack operations. Preferably, the transaction layer functions comprise a PUSH function that pushes the current active transaction, if any, onto the transaction stack, thereby suspending it; a POP function that pops a transaction context from the transaction stack and resumes it by making it the current active transaction; and a COUNT function that returns the number of transactions currently stored on the transaction stack.

Figure 3A:
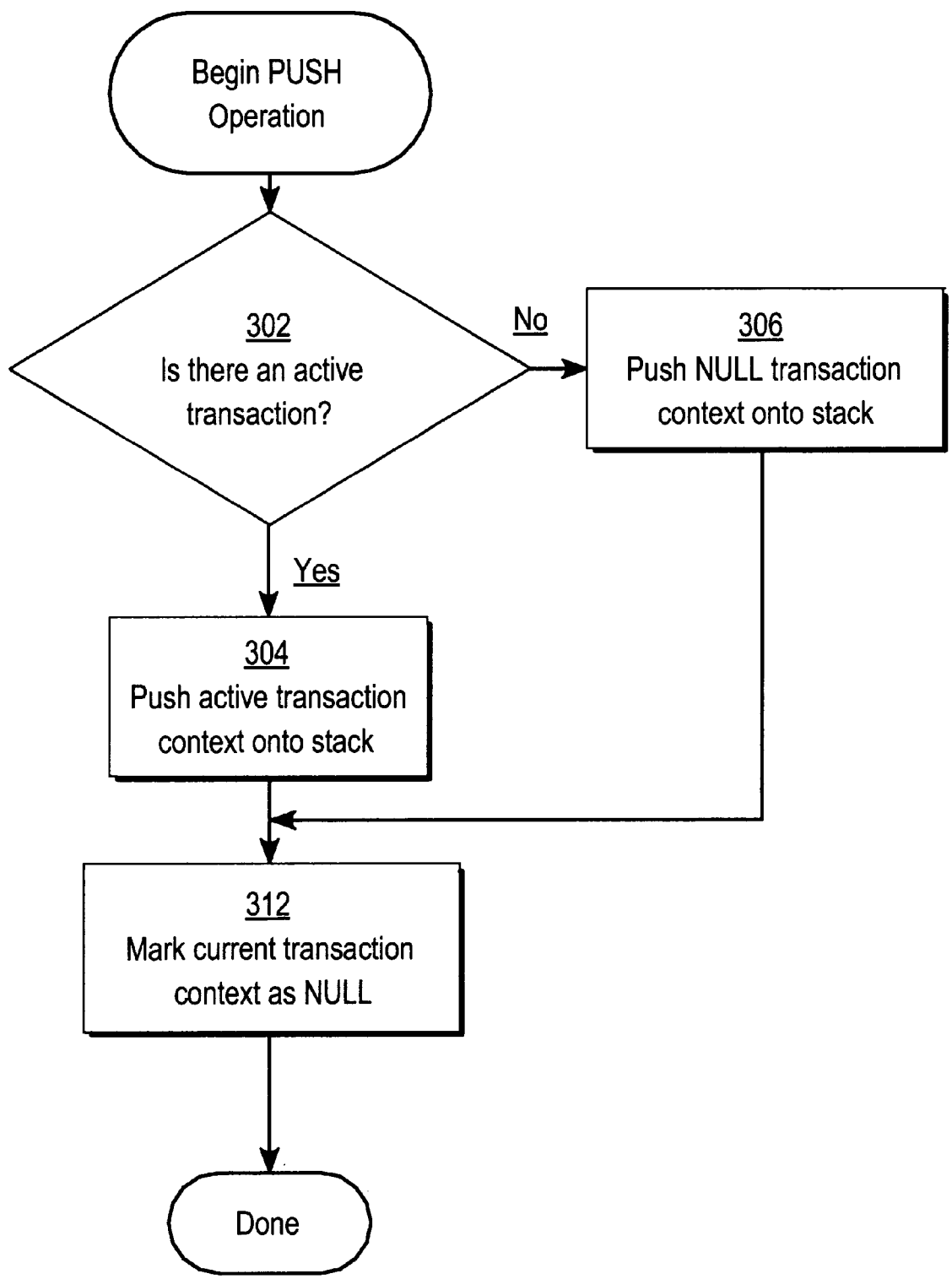
FIG. 3A is a flow diagram of a push method.

PUSH FUNCTION. FIG. 3A is a flow diagram of steps carried out by a preferred embodiment of the PUSH function. The transaction context is a set of values that are maintained by the database server for use in transaction processing. In the Oracle8 database server, the transaction context is stored in a transaction state object. In step 302, the PUSH function tests whether an active transaction presently exists. If there is no active transaction, then in step 306 a NULL transaction context is pushed onto the transaction stack. In step 304, the PUSH function pushes the current transaction context, taken from the transaction state object, onto the transaction stack for the session. For example, the PUSH function adds a frame to the top of the stack that contains the information identifying the currently executing transaction that is in the transaction state object.

As shown by block 312, the current transaction context is marked as NULL. Preferably, step 312 involves calling a separate kernel function with a NULL parameter.

Thus, PUSH ensures that at the end of the push, the transaction context is in a state such that any transaction that is started within the autonomous scope is not aware of the parent transaction. After a PUSH, the first substantive operation to execute (such as an SQL statement) creates a new autonomous transaction and it becomes the current or active transaction. When the autonomous transaction is committed or rolled back, the current transaction is marked NULL. If a statement is executed after the new transaction commits or rolls back, but before a POP is executed, then another new autonomous transaction is created.

Figure 3B:
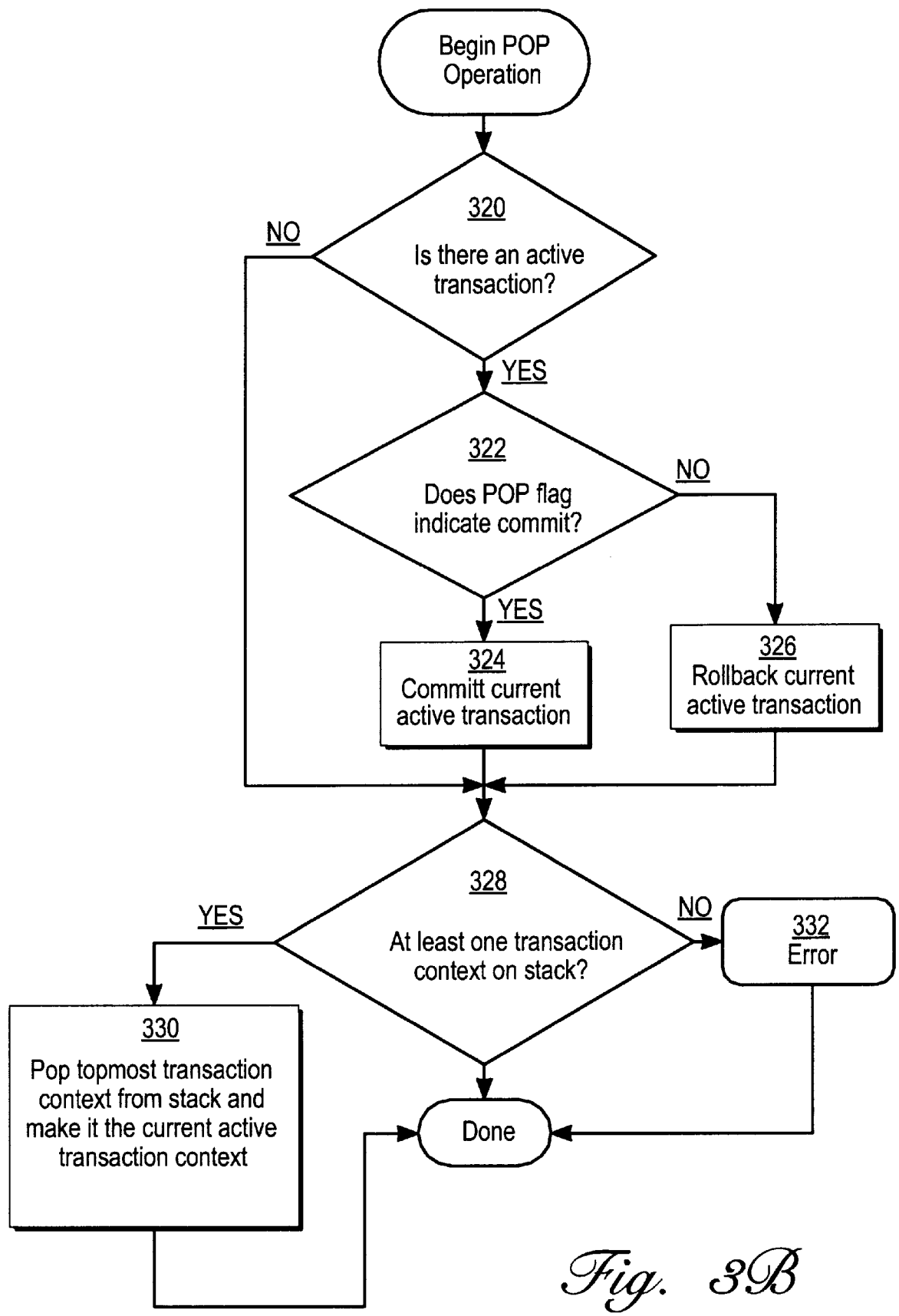
FIG. 3B is a flow diagram of a pop method.

POP FUNCTION. FIG. 3B is a flow diagram of steps carried out in a preferred embodiment of the POP function. Generally, the POP function restores the transaction identified by the top frame on the stack as the current transaction context, and the top frame is deleted from the stack.

Preferably, the POP function receives, as an input parameter from a calling program, a flag that indicates whether to rollback the current active transaction if there is one. When the value of the flag is "0", then the transaction must be committed; when the value of the flag is "1", then the transaction must be rolled back. Accordingly, as shown in step 320, the POP function tests whether a current active transaction exists, for example, by testing whether the current transaction context is NULL. If there is a current active transaction, then in step 322 the POP function tests the state of the flag. If the flag indicates that the current transaction should be committed, then in step 324 the POP function commits the current active transaction. Otherwise, if the flag indicates a rollback should be done, then in step 326 the POP function rolls back the current active transaction.

In step 328, the POP function tests whether at least one transaction context is stored on the stack. If there are no transaction contexts on the stack, then in step 332 POP issues a transaction error. Preferably, the POP function returns a value of "1" if there was an active transaction, and "0" if there wasn't.

If at least one transaction context is on the stack, then as shown in step 330, the POP function pops the topmost or "last in" transaction context from the transaction stack for the session. In an embodiment, step 330 involves copying information in the topmost frame into a transaction context object that stores the transaction context of the current transaction context, and deleting the topmost frame from the stack. The transaction context that is popped will also be the current transaction context for subsequent operations.

COUNT FUNCTION. The count function returns the number of transaction contexts on the stack. As described further herein, the COUNT function is used to determine the number of levels or nesting of autonomous scopes.

EXAMPLE OF PUSH AND POP. The pseudo-code in Table 1 presents an example of PUSH and POP in a multiple transaction context:

TABLE 1

EXAMPLE PUSH AND POP

```
execute trans1
PUSH              /* push long transaction trans1 onto stack */
execute some debug statements   /* these operations occur in a new
                                   autonomous transaction */
commit            /* commits changes of new autonomous transaction */
POP               /* make trans1 the currently executing transaction */
continue work in trans1
commit            /* commits changes made by trans1 */
```

TRANSACTION STACK FUNCTION PACKAGING

One aspect of the preferred embodiment is concerned with promoting the use of reusable components, such as procedures written in the PL/SQL language, for carrying out operations in an autonomous transaction, without the caller of such a component having to worry about whether or not the sub-component exited cleanly. In this context, "exited cleanly" means, for example, completing any autonomous transactions that it began. It has been found to be desirable to package the PUSH and POP operations in a way that prevents an application programmer from accessing them directly, in order to prevent certain undesirable results. For example, if a main transaction in the program "bar" calls a PL/SQL procedure named "foo" to carry out some operations in an autonomous transaction, the following programming errors in foo could occur.

1. The programmer could fail to include an initial PUSH operation in foo, so that all its changes would be part of the main transaction. Therefore, if foo commits or rolls back, foo will cause the main transaction to commit or roll back.

2. The programmer could fail to configure foo to commit or roll back the autonomous transaction that it began. Thus, upon return to the calling procedure, all of the calling procedure's changes would become part of foo's autonomous transaction, rather than the main transaction.

3. The programmer could cause foo to commit or roll back its autonomous transaction, but fail to include a complementary POP operation to restore the main transaction. Thereafter, if the calling procedure failed to check the current transaction context upon returning from foo to determine if a POP is required, then any further changes made by the calling procedure would occur in a new autonomous transaction.

To avoid the foregoing problems, an aspect of the preferred embodiment involves handling autonomous transactions in a way that is transparent to the programmer of a calling procedure that calls a reusable component, and transparent to the programmer of the reusable component.

In one embodiment, a compiler directive named AUTONOMOUS_TRANSACTION is used by the programmer of a reusable component to indicate to the compiler that all operations carried out in the component are to be performed in one or more autonomous transactions. In the preferred embodiment, the compiler directive is implemented in the form of a PL/SQL source language construct named "pragma AUTONOMOUS_TRANSACTION ("AT")." FIG. 2 shows an exemplary declaration 204 that contains the compiler directive AT. The pragma specification provides the ability to execute autonomous transactions in PL/SQL blocks on the server. Preferably, the PUSH and POP operations are carried out automatically by the PL/SQL runtime, transparent to the programmer and user.

In an alternate embodiment, the compiler of one or more high-level programming languages, such as C, is modified to support autonomous transactions. In one such embodiment, the source program has an embedded PL/SQL block that includes a declaration of the pragma AT.

When the compiler encounters the AUTONOMOUS_TRANSACTION compiler directive, in response the compiler generates code to carry out the following:

1. Upon entry to the component or code segment that is delineated by the directive, performing a PUSH to put the calling procedure's transaction context onto the stack. Accordingly, all database changes performed in the component or code segment are part of one or more autonomous transactions. After each commit or rollback in the component, a subsequent database operation (such as an SQL statement) will begin a new autonomous transaction.

2. Immediately before returning to the calling procedure, performing a POP that restores the calling procedure's transaction context.

3. Raising an error if the component attempts to exit normally without having committed or rolled back each autonomous transaction that was started during execution of the component.

4. Rolling back any pending autonomous transactions when the component is exited due to an exception.

SERVER SIDE PACKAGING

The preferred embodiment includes a mechanism providing the ability to execute autonomous transactions in PL/SQL blocks on a server. A block of a PL/SQL program is declared to be autonomous using a pragma specification, namely, "pragma AUTONOMOUS_TRANSACTION".

There is also a mechanism that enables autonomous transactions to be executed by a database application program that is prepared in a third-generation programming language, such as the C language, rather than in PL/SQL. The application program includes an embedded block that is expressed in the PL/SQL language. Programming languages such as Pro*C and OCI currently provide this capability.

CLIENT SIDE PACKAGING

In the preferred embodiment, autonomous transactions are executed on a client. Two approaches are preferred in providing such capability. In the first approach, autonomous transactions are declared in a PL/SQL program using the same method described above in connection with server-side operations. The PL/SQL client-side runtime program has a client-side interface that makes available, to client-side programs, the server-side autonomous transaction services of the database server kernel. In the second approach, client-side applications use function calls or an API that is embedded in the programming language to push and pop autonomous scopes.

DECLARING AUTONOMOUS PROGRAM BLOCKS

In the preferred embodiment, a portion of a computer program is marked as an autonomous block using a pragma specification. The specification appears anywhere in the declaration section of the autonomous block. The specification is placed in that section only once. For example, the code excerpts shown in Table 2 and Table 3 mark, as autonomous, a stored procedure and a package method, respectively:

TABLE 2

EXAMPLE STORED PROCEDURE create or replace procedure foo(a number) is
   pragma AUTONOMOUS_TRANSACTION;
   . . .
begin
   . . .
end;

TABLE 3

EXAMPLE PACKAGE METHOD create or replace package P is
   procedure foo(a number);
end P;
/
create or replace package body P is
   procedure foo(a number) is
     pragma AUTONOMOUS_TRANSACTION;
     m number := 10;
   begin
   . . .
   . . .
   end;
end P;
/

In Tables 2 and 3, in this context, the term "autonomous block" refers to the "BEGIN . . . END" section of a block that is marked with a declaration of an autonomous transaction block.

The foregoing marking approach has several advantages. First, the approach takes advantage of the block structure of the source programming language to unambiguously identify the scope of an autonomous transaction. Second, the approach is less prone to programmatic errors than other approaches. For example, when a calling application is using a sub-component, the calling application need not be concerned about whether the sub-component exited "cleanly" or not. In this context, a "clean" exit is an exit in which the sub-component completed all autonomous transactions that it began.

Third, the approach is easy to use. For example, the approach is consistent with the existing PL/SQL model for top-level transactions, in that an autonomous transaction need not be named or identified with a handle. The invocation of an autonomous block automatically puts the program in the context of a separate transaction.

STARTING AUTONOMOUS TRANSACTIONS

In the preferred embodiment, no special action is needed to start an autonomous transaction within a properly declared autonomous transaction block. When a transactional operation is executed in an autonomous transaction block, an autonomous transaction is automatically started. If an autonomous transaction is already active, then that autonomous transaction is used.

OPERATIONS CARRIED OUT UPON EXIT; EXIT CONDITIONS

In the preferred embodiment, certain operations are carried out when an autonomous transaction block is exited. When a normal exit from an autonomous transaction block occurs, the system tests whether there are any pending autonomous transactions that were started by the current block, or any block called from it. If so, the pending autonomous transaction is rolled back, and an error is raised. Thus, any autonomous transaction must be explicitly terminated through a commit or rollback before control exits from the autonomous block in which the autonomous transaction was started.

When an abnormal exit occurs, for example, due to an exception that is not handled by the current block, any pending autonomous transaction started by the current block, or any block called from it, will be rolled back. Further, in either case, the caller's transaction context is restored upon any exit from an autonomous transaction block.

EXAMPLE OF TRANSACTION CONTEXT AND EXIT PROCESSING

The foregoing approaches and mechanisms are illustrated in the following discussion of the exemplary code set forth in Table 4.

TABLE 4

CONTEXT, EXIT PROCESSING EXAMPLE

| | |
|---|---|
| 1 | procedure dbg (msg varchar2) is |
| 2 | begin |
| 3 |   insert into debug_tab values (msg); |
| 4 | end; |
| 5 | |
| 6 | procedure INNER is |
| 7 |   pragma AUTONOMOUS_TRANSACTION; |
| 8 | begin |
| 9 |   insert into dept values ('CS', 112); |
| 10 |   insert into dept values ('EE', 113); |
| 11 | |
| 12 |   dbg('inserted 2 rows'); |
| 13 | |
| 14 |   commit; |
| 15 | |
| 16 |   insert into dept values ('ME', 114); |
| 17 | |
| 18 |   dbg('inserted 1 row'); |
| 19 | |
| 20 |   commit; |
| 21 | end; |
| 22 | |
| 23 | procedure OUTER is |
| 24 |   n number; |
| 25 | begin |
| 26 |   insert into tab values (10); |
| 27 |   INNER; |
| 28 |   insert into tab values (20); |
| 29 |   commit; |
| 30 | end; |

When OUTER is invoked, the following sequence of transactional operations occurs. First, at line 26, a top level transaction (named, for example, "T1") is started to perform the INSERT operation. At line 27, the autonomous procedure INNER is invoked. When program execution reaches the "BEGIN . . . END" block corresponding to the autonomous block, that is, at line 8, the transaction context of the calling transaction (T1) is suspended.

At line 9, an autonomous transaction (named, for example, "T2") is started to perform the INSERT operation. The INSERT at line 10 is executed as part of transaction T2. At line 12, a non-autonomous block DBG is called to log a debug message to a table. The DBG block inherits the current transaction context. As a result, the INSERT at line 3 is done as part of T2. Transaction T2 ends at line 14, at which T2 is committed. The COMMIT at line 14 does not reset the transaction context to T1.

At line 16, a second autonomous transaction (named, for example, "T3"), is started for the INSERT operation. At line 18, a non-autonomous block DBG is called to log a debug message to a table. The DBG block inherits the current transaction context. As a result, the INSERT operation at line 3 is clone as part of transaction T3. The transaction T3 ends at line 20 at which a COMMIT occurs.

At line 21, upon exit from the autonomous transaction block INNER, the transaction context of the calling transaction (T1) is resumed. Thus, the INSERT operation at line 28 is executed as a part of T1. Line 29 commits transaction T1.

USING SAVEPOINTS

In some past database systems, for example, in the Oracle® database system, user savepoints for a parent transaction have been maintained in a session state object. Generally, this approach works only when there is one active transaction at a time in each session, that is, the approach is limited to a system that permits only serial transactions. In contrast, in a system that provides for autonomous transactions, there may be many concurrently active transactions per session. Accordingly, in the preferred embodiment, savepoints are stored in a transaction state object, in which a separate object is instantiated and maintained for each transaction. Preferably, savepoints are stored in the form of a linked list of objects in which the head of the list is stored in the transaction state object. In practice, the linked list operates as a stack.

In the preferred embodiment, autonomous transactions may include savepoints. Preferably, rollback to a savepoint of an autonomous transaction is declared in a program using the same statements used in regular transactions. Rollback of a transaction to a savepoint taken before an intermediate autonomous transaction will not roll back the autonomous transaction. The scope of a savepoint is the transaction in which it is defined. Hence, an autonomous transaction and its parent need not have unique savepoint names. Savepoints defined in a transaction are completely independent of savepoints defined in its autonomous transactions.

Within an autonomous transaction, rollback is permitted only to savepoints taken in the current transaction, whether autonomous or not. In particular, rollback to savepoints taken in a parent transaction is not permitted. In order to rollback to a savepoint taken in a parent transaction, program control must first return to the context of the parent transaction. For example, when autonomous transactions are associated with the lexical scope of a block, to roll back to a savepoint in the parent transaction, a transaction must first exit from the autonomous block, and then issue the rollback.

The foregoing approach to savepoints is illustrated in the following discussion of the pseudo-code set forth in Table 5.

TABLE 5

SAVEPOINT EXAMPLE

| | |
|---|---|
| 1 | begin |
| 2 |   . . . do some updates . . . (Transaction 1) |
| 3 |   SAVEPOINT X; |
| 4 |   . . . do some updates . . . (Transaction 1) |
| 5 |   SAVEPOINT Y; |
| 6 |   declare |
| 7 |     pragma AUTONOMOUS_TRANSACTION; |
| 8 |   begin |
| 9 |     . . . do other updates . . . (Transaction 2) |
| 10 |     SAVEPOINT X; |
| 11 |     . . . further processing . . . |
| 12 |     ROLLBACK TO X; |

TABLE 5-continued

SAVEPOINT EXAMPLE

| 13 | . . . something else . . . | |
|----|----------------------------|--------|
| 14 | ROLLBACK TO Y; | --error |
| 15 | commit | |
| 16 | end; | |
| 17 | . . . further processing . . . | |
| 18 | ROLLBACK TO X; | |
| 19 | end; | |

In this example, when execution reaches line 12, the ROLLBACK TO X operation will cause a rollback to savepoint X of Transaction 2 that was taken in line 10. The attempted rollback expressed in line 14 will cause a run-time error, because the savepoint Y taken in Transaction 1 is not visible from the currently active transaction, which is transaction 2. The rollback statement of line 18 will roll back to savepoint X of Transaction 1 that was taken in step 3.

To support proper savepoint operations, it is necessary for the database server or compiler to maintain savepoints on a transaction basis.

COMMIT, ROLLBACK, SET TRANSACTION

In the preferred embodiment, existing transaction-processing statements such as COMMIT, ROLLBACK, and SET TRANSACTION generally operate in known manner. If transaction properties are set by issuing a SET TRANSACTION statement in the parent transaction, then such properties are valid only for the parent transaction. The properties are not valid in an autonomous transaction block invoked by the parent. Similarly, any SET TRANSACTION statement issued within an autonomous block is valid only for the transaction in which it is issued, and does not affect the properties set in the parent transaction.

PROGRAMMING LANGUAGE INTERFACE

In one embodiment, the PUSH and POP transaction stack functions are implemented by modifying the compiler of a programming language so as to compile and generate code for two new source language function calls. For example, function calls OCITransPush and OCITransPop are provided to implement the PUSH and POP functions described above. However, while the PUSH and POP functions respectively push and pop transaction context information to and from the stack, these functions do not begin or end transactions. Accordingly, in the preferred embodiment, one or more function calls are defined that suspend a transaction, begin a new autonomous transaction, and resume the suspended transaction.

Preferably, a compiler recognizes a function call generally known as a BEGIN AUTONOMOUS call and having the form OCIBeginAutonomous (OCISvcCtxk *svchp, OCIError *errhp) in which the parameter or variable "OCISvcCtxk" is a data structure containing information about the current context of the server 106, and in which the parameter or variable "OCIError" is a data structure containing error context information.

Figure 4A:
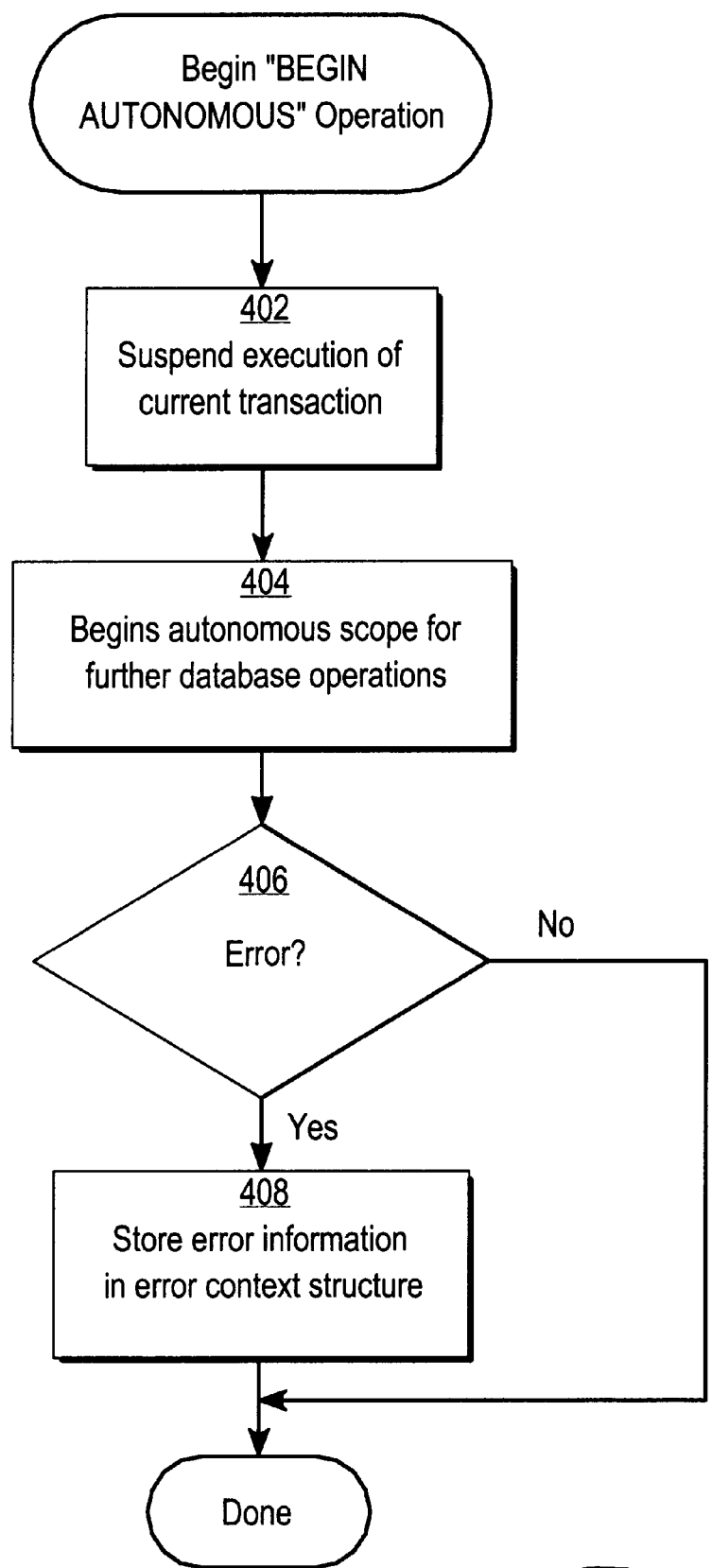
FIG. 4A is a flow diagram of a begin autonomous method.

FIG. 4A is a flow diagram of steps carried out in a preferred embodiment of the BEGIN AUTONOMOUS function. As shown step 402, the BEGIN AUTONOMOUS function suspends execution of the current transaction. In step 404, an autonomous scope is begun in which further database operations are carried out. In step 406, the function tests whether an error occurred in carrying out the preceding steps. If so, the error is signaled through an error reporting mechanism, such as by storing error information in the OCIError error context structure.

Further, in the preferred embodiment, the compiler recognizes a function call generally known as the END AUTONOMOUS function and having the form OCIEndAutonomous (OCISvcCtxk *svchp, OCIError *errhp) in which the parameter or variable "OCISvcCtxk" is a data structure containing information about the current context of the programming language server, and in which the parameter or variable "OCIError" is a data structure containing error context information.

Figure 4B:
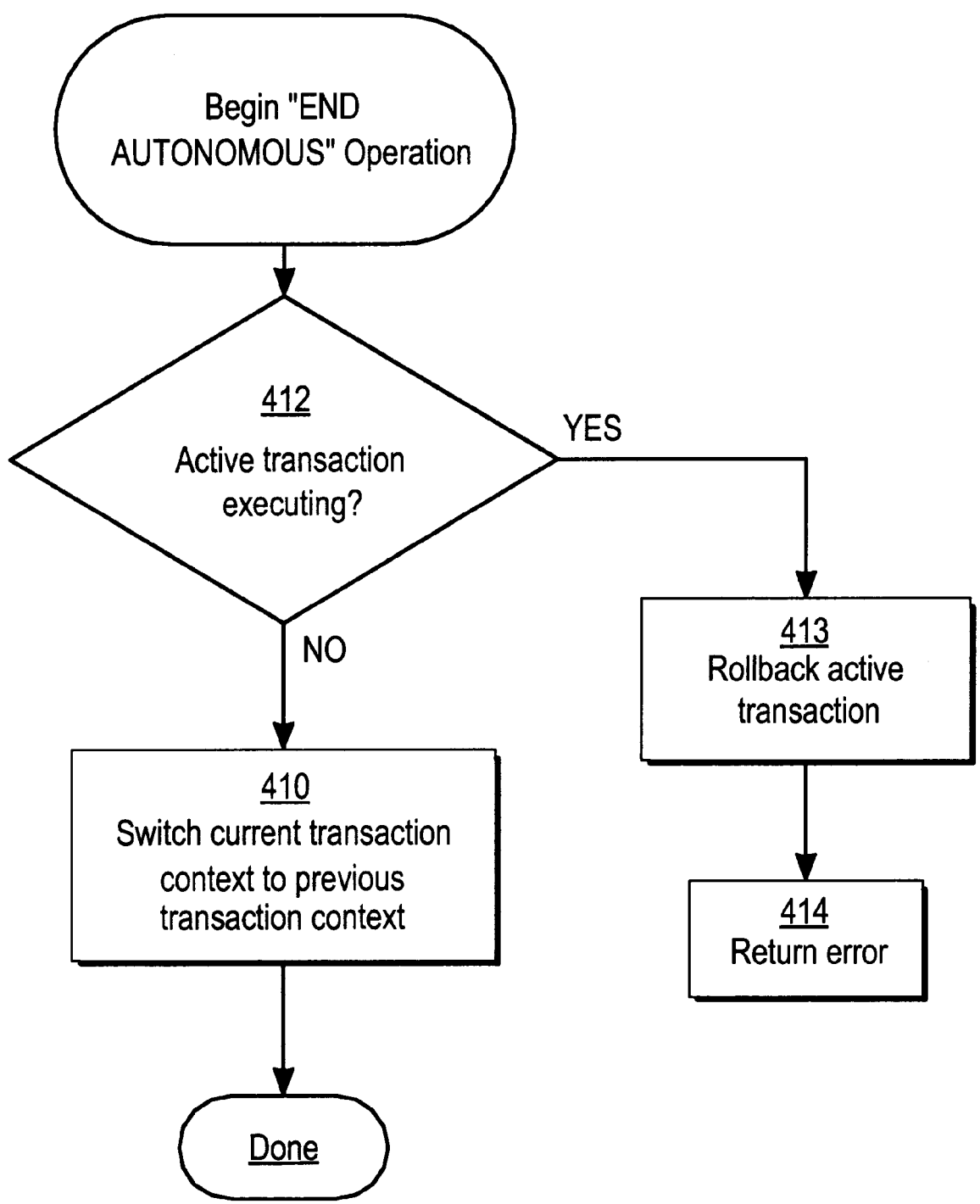
FIG. 4B is a flow diagram of an end autonomous method.

FIG. 4B is a flow diagram of a preferred method of carrying out the END AUTONOMOUS function. In step 412, the function tests whether there is an active transaction executing. If not, then step 410, the function switches the current transaction context to the previous transaction, if there was one. If there is an active transaction such that the test of step 410 has a true result, then as shown in step 414, an error will be returned, because the active transaction is required to commit or rollback before exiting the autonomous block. If there is no previous transaction, no error or warning is issued.

Also in the preferred embodiment, the PUSH, POP, and COUNT transaction stack operations are available in a high-level database application programming language, such as C, through a single function call. The PL/SQL runtime, which is implemented in the C language, uses the C function calls carry out push and pop operations. In the preferred embodiment, the C function has the form word PSDATX (IN word opcode, IN word popflag) in which "opcode" is a parameter provided by the calling program to indicate what operation to perform. "popflag" is a Boolean status flag provided by the calling function to indicate whether any current active transaction should rollback or commit during a pop operation. Preferably, "opcode" is set to one of three different pre-defined constant values. The first constant value signifies the PUSH operation, the second constant value signifies the POP operation, and the third constant value signifies the COUNT operation described above. For example, the constant values can be named PSDATX_PUSH, PSDATX_POP, and PSDATX_LEVEL and may have values of "0", "1", and "2" respectively.

Also preferably, the PSDATX function returns a numeric value, in which "0" indicates successful completion of an operation, the value "1" indicates a failure, and a value greater than "1" identifies the number of transaction contexts on the stack. The failure value of "1" is returned if there was an active transaction during a POP operation. Alternatively, PUSH, POP, and COUNT stack operations, or equivalent functions that add and remove stack frames, and report the depth of the stack, are available in more than one function or call of a programming language.

PROCESSING AUTONOMOUS TRANSACTIONS USING THE TRANSACTION STACK

As generally indicated above, the autonomous transaction mechanism of the preferred embodiment has a compile-time aspect and a run-time aspect. The compile-time aspect involves processing a source program text and generating executable machine code based on the source program. In the compile-time aspect, a programming language compiler is modified to detect and respond to the declaration of an autonomous transaction block in the text of a source program. General information about the structure and operation of compilers is well known in this field and will not be presented here to avoid obscuring the invention. A general reference work about compilers is A. Aho et al., "Principles of Compiler Design" (Reading, Mass.: Addison-Wesley, 1977).

Figure 5A:
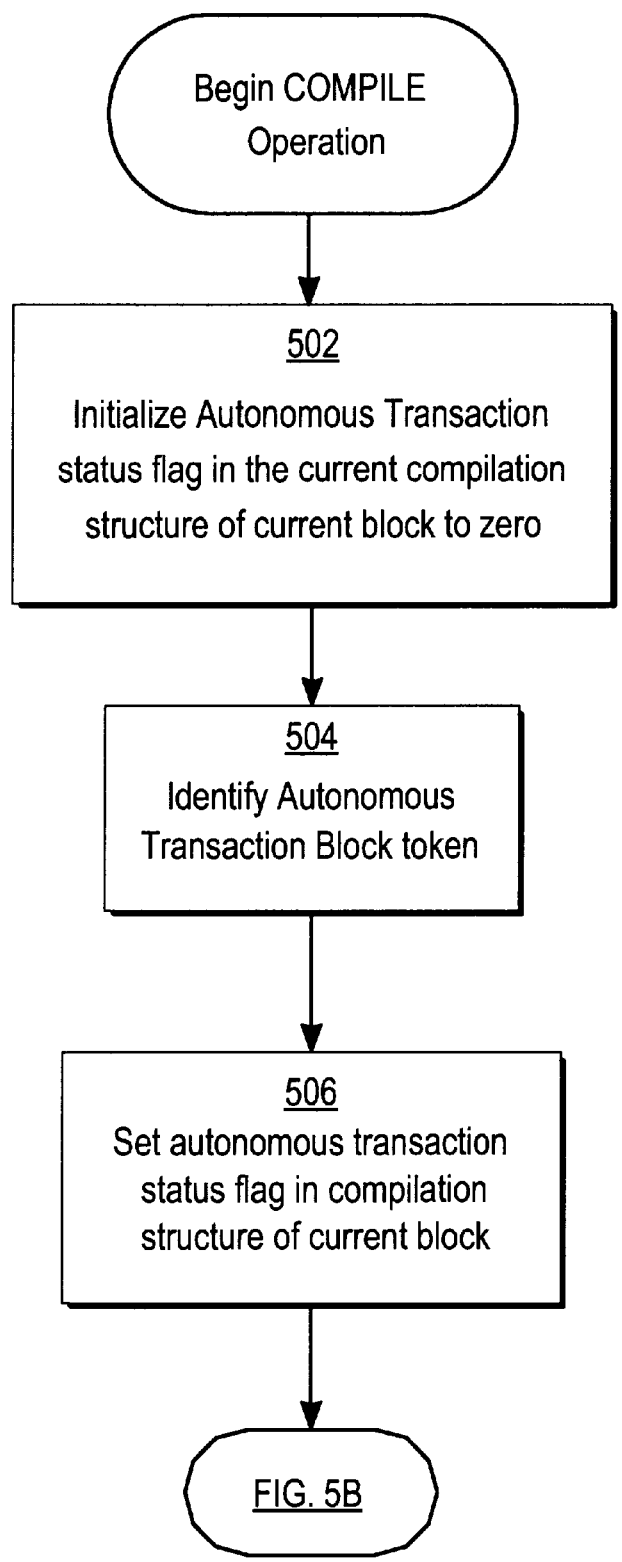
FIG. 5A is a flow diagram of a compilation method.

FIG. 5A is a flow diagram of preferred steps for carrying out a method of compiling a PL/SQL block program that contains one or more autonomous transaction blocks. Preferably, the compiler stores and maintains a one-bit status flag that indicates whether an autonomous transaction block has been declared earlier in the source program. In step 502, storage for the flag is allocated and the value of the flag is initialized to "0".

Generally compilers operate, in part, by scanning a source program text, identifying words or phrases that are valid in a particular programming language, and associating each recognized keyword with a unique token. This pass through the source program is known as the parsing stage. In a second pass through the source program known as the code generation phase, machine code is generated from tokens. In the preferred embodiment, the keyword AUTONOMOUS_TRANSACTION is associated with a unique compiler token. In the code generation phase, as shown in step 504, the compiler recognizes a token that reflects the declaration of an autonomous transaction block. In step 506, the status flag is set in the compilation structure of that block.

Figure 5B:
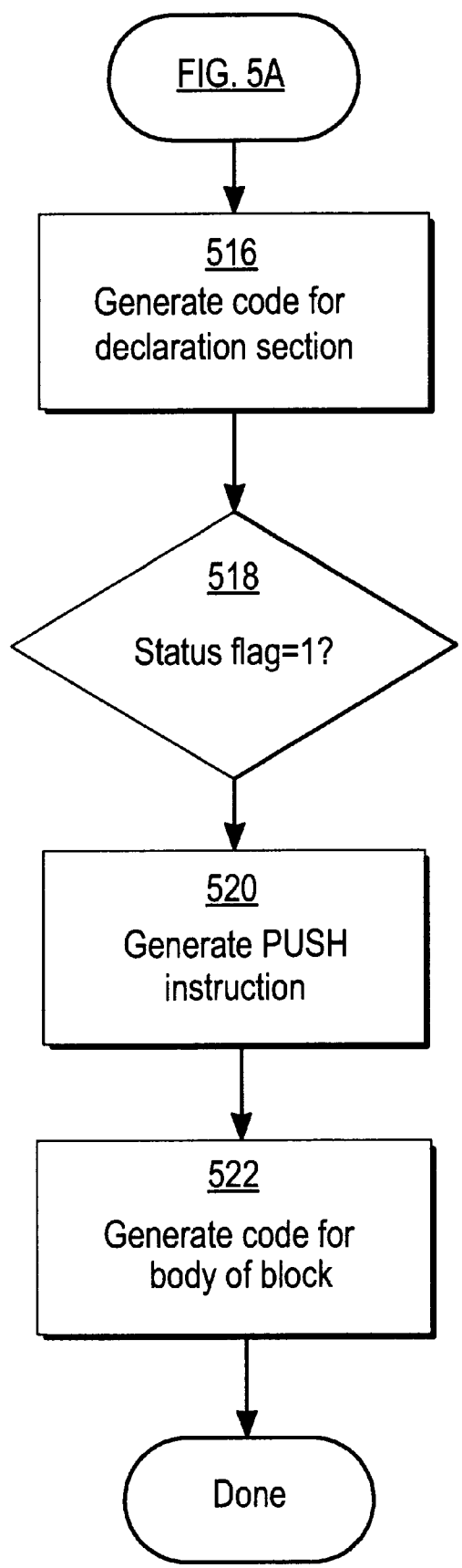
FIG. 5B is a flow diagram of further steps in the method of FIG. 5A.

FIG. 5B is a flow diagram of further steps. In step 516, the compiler generates code for the declaration section of a block. For example, in the program shown in FIG. 2, an ENTER instruction 206 is generated. If there are variable declarations, such as the number declarations 208 shown in FIG. 2, then corresponding machine instructions 212 are generated in the machine code 210.

In step 518, the status flag in the compilation structure for the block is tested. If the status flag is set, as shown in step 520, a PUSH instruction is generated to cause (at runtime) the current autonomous transaction context to be pushed onto the stack. In an embodiment, the PUSH instruction is named PATXS (push autonomous transaction scope) and is generated immediately following the initialization code for the current block. As shown in FIG. 2, the PATXS instruction 214 is generated when a BEGIN keyword 216 is encountered, even though the AT declaration 204 appears earlier in the source code 200. In step 522, the compiler processes the body of the current block, that is, the source code located between BEGIN and END statements, and appropriate code is generated in conventional manner. When an END statement 224 is reached, a corresponding RET (return) instruction 218 is generated.

Figure 5C:
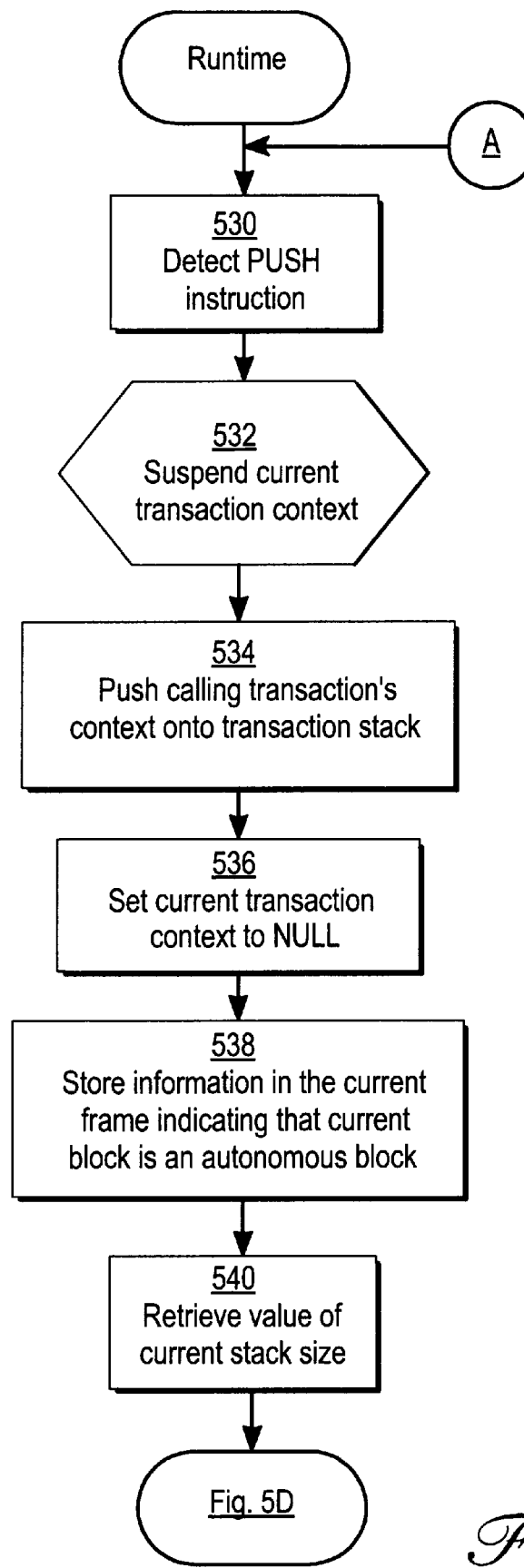
FIG. 5C is a flow diagram of runtime processing steps.
Figure 5D:
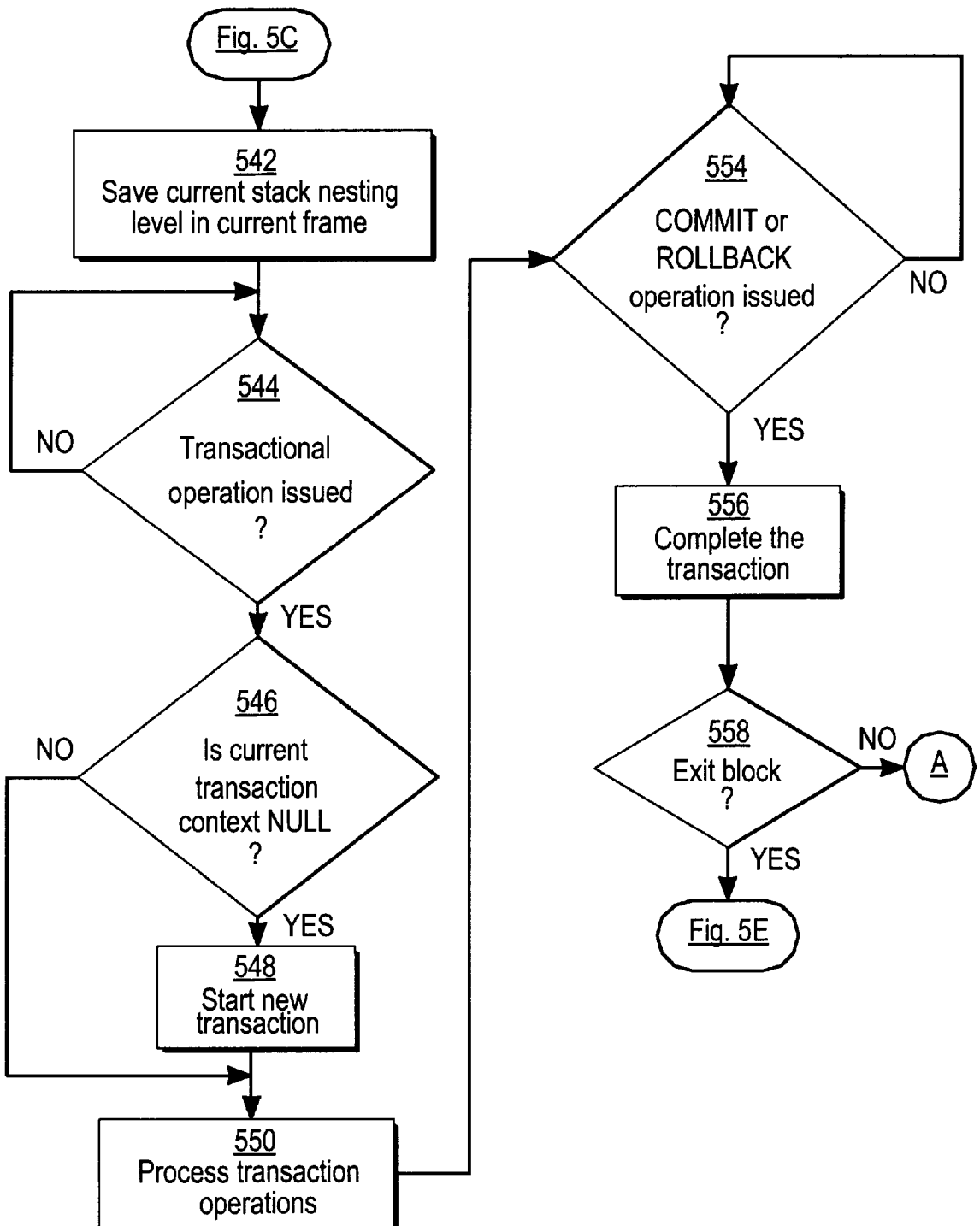
FIG. 5D is a flow diagram of further steps in the method of FIG. 5C.

FIG. 5C is a flow diagram of steps that are carried out during execution or runtime of a program that has been compiled according to the foregoing method. In block 530, at runtime, a PUSH instruction is encountered. In response, in block 532, the current transaction context is suspended and a new autonomous scope is entered. In the preferred embodiment, block 532 involves carrying out the steps shown in blocks 534 to 542. In step 534, the calling transaction's context is pushed onto the transaction stack. In step 536, the current transaction context is set to NULL.

In step 538, information is stored in the current frame (state structure) to indicate that the current block being executed is an autonomous block. In the preferred embodiment, execution of the PUSH instruction causes information to be stored in the runtime state structure corresponding to the block that indicates that the current block is an autonomous block. For example, the PATXS instruction causes a flag to be set in the state structure of the current runtime frame, which causes the runtime module 144, 146 to remember that the current scope is autonomous scope.

Further, in the preferred embodiment, as shown in step 540 the PUSH instruction retrieves, from the transaction layer of the database server 106, a value of the current nesting level or depth of the autonomous transaction scopes. In step 542, the value of the current stack nesting level is saved in a local storage location in the current frame's structure for later use in error checking. Thus, a value reflecting the current depth of the stack is stored during the push operation, so that during a pop from the current block, the depth value may be retrieved and compared to the current stack level. This ensures that the correct transaction context is popped. Further, when an autonomous block of an executing program is entered, an autonomous transaction does not actually begin. The transaction layer simply pushes the parent's transaction context on a stack, and sets the current transaction context to NULL. Transactions begin and end in conventional manner.

In particular, in the preferred embodiment, as shown in block 544, issuance of a transactional operation, such as an INSERT statement, is detected. In block 546, the current transaction context is tested to determine whether it is NULL. If so, as shown in block 548, a new transaction is started. In block 550, the INSERT statement or other transaction operations are processed.

In block 554, issuance of a COMMIT or ROLLBACK operation is detected. In response, in block 556, the transaction is completed. Thus, an autonomous block may have several distinct autonomous transactions that are all executed independent of the caller's transaction context.

In block 558, an exit from an autonomous transaction block is detected. Generally, an exit is detected either when the RET (return) instruction 218 is encountered during execution of the program, or due to an exception that occurs during execution.

Figure 5E:
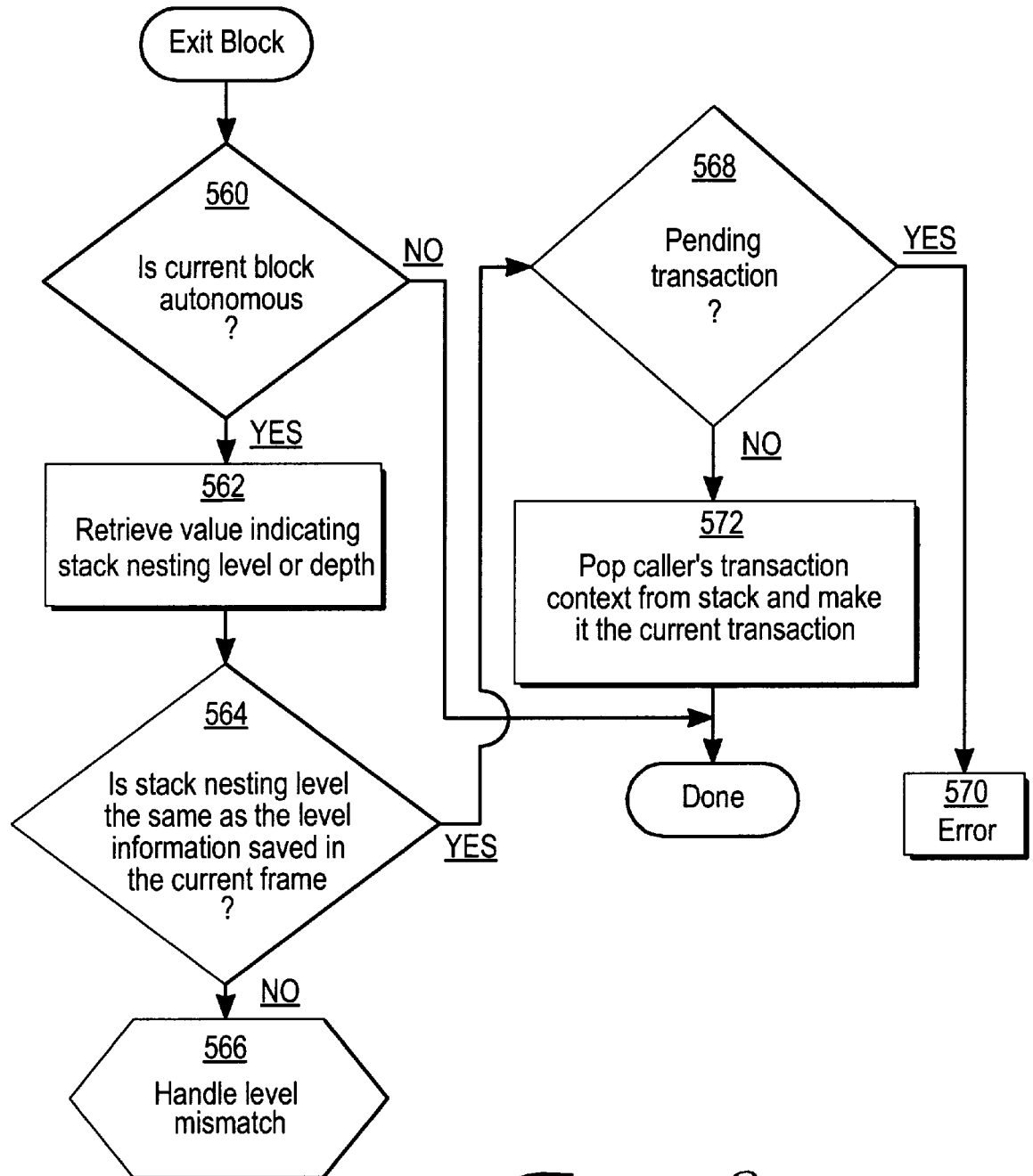
FIG. 5E is a flow diagram of block exit processing steps.

FIG. 5E is a diagram of steps carried out when a lexical block is exited. In block 560, the system tests whether the block exited from is an autonomous block. In the preferred embodiment, block 560 involves testing a bit in a runtime data structure that indicates whether an autonomous block was in use. If so, then in block 562 the system retrieves a value indicating the stack nesting level or depth of the autonomous transaction scopes from the transaction layer of the database server. In block 564, the system tests whether the stack nesting level is the same as the level information saved in the current frame. Block 564 is called a level check.

If the level check succeeds, then in block 568 the system tests whether there is an active transaction, that is, a transaction that has not been completed through a rollback or commit operation. If so, an error is raised in block 570, because the active transaction must be committed or rolled back before the runtime module returns to the caller's transaction context.

If the level check succeeds and there is no transaction active in the autonomous scope, then in block 572 the autonomous scope is exited and the caller's transaction context is restored, by popping the caller's transaction context from the stack. Thus, the caller's transaction context is resumed when an autonomous block is exited.

If the level check fails, then a level mismatch exists, and it is handled in block 566. As described above, one alternative implementation of the foregoing mechanism involves providing program functions that can be called from a source program written in a programming language such as C or Java. In this context, such an implementation is said to expose transaction layer functions of the foregoing mechanism to a source program. If an application using transaction layer functions does not correctly match its calls to the correct push and pop level, then a level mismatch can occur. The level checking mechanism described above catches level mismatches, if any, when an autonomous transaction block is exited. As a result, when control is returned to the caller, its transaction context is correctly restored.

Generally, two types of level mismatches can occur. In the first type, the current autonomous scope level is more than expected. The first type of level mismatch can occur when fewer pops than pushes have been issued from the current block, or other blocks called from it. In the preferred embodiment, the first type of level mismatch is handled in block 566 by popping back an appropriate number of times until the caller's transaction context is reached. In the process, pending transactions, if any, at each level are rolled back, and an error is raised. Since the caller's transaction context is still intact, the caller has the option of handling the exception and proceeding normally.

In the second type of level mismatch, the current autonomous scope level is less than expected. The second type of level mismatch occurs when more pops than pushes have been issued from the current block or other blocks called from it. This situation implies that the current block has conceptually stepped into the caller's transaction context, and also ended the caller's transaction context by committing it or rolling it back. In response, in block 566, an internal error is raised.

CODE GENERATION EXAMPLE

Table 6 illustrates an exemplary source program and the code that is generated from it according to the above mechanism.

TABLE 6

CODE GENERATION EXAMPLE

LINE SOURCE CODE

```
1     procedure bar is
2
3        pragma AUTONOMOUS_TRANSACTION;
4
5        raise_factor number := get raise_factor();
6
7     begin
8
9        UPDATE emp SET sal = sal * raise_factor;
10
11       commit;
12
13    end;
```

LINE MACHINE CODE

| BAR: | 00001: | ENTER | 96, 0, 1, 1 | --enter frame |
|------|--------|-------|-------------|---------------|
| BAR: | 00009: | INFR  | DS[0]+120   | --set up frame variables |

[Line 5] raise_factor number := get_raise_factor ()
--declare block code

| BAR: | 00014: | INSTB | 2, STPROC |
| BAR: | 00018: | MOVA  | FP+16, FP+4 |
| BAR: | 00023: | XCAL  | 2, 1 |
| BAR: | 00028: | MOVNU | FP+16, FP+8 |
| BAR: | 00033: | PATXS | --start autonomous scope at BEGIN statement |

TABLE 6-continued

CODE GENERATION EXAMPLE

[Line 9] UPDATE emp SET sal = sal * raise_factor;

| BAR: | 00034: | INSTC2 | GF[0], DS[0]+32, FP+24 |
| BAR: | 00044: | BIND   | FP+24, 0, SQLT_VNU(6), FP+8, <IN, SCLR> |
| BAR: | 00054: | EXECC  | FP+24, 0x20 |

[Line 11] commit;

| BAR: | 00059: | INSTS | 1 |
| BAR: | 00062: | INSTB | 1, SPEC_BODY |
| BAR: | 00066: | XCAL  | 1, 207 |
| BAR: | 00071: | RET   | --return to caller, also pop to caller's transaction |

The foregoing example shows how a PATXS instruction and a RET instruction are placed in the code generated for an autonomous transaction block.

HARDWARE OVERVIEW

Figure 6:
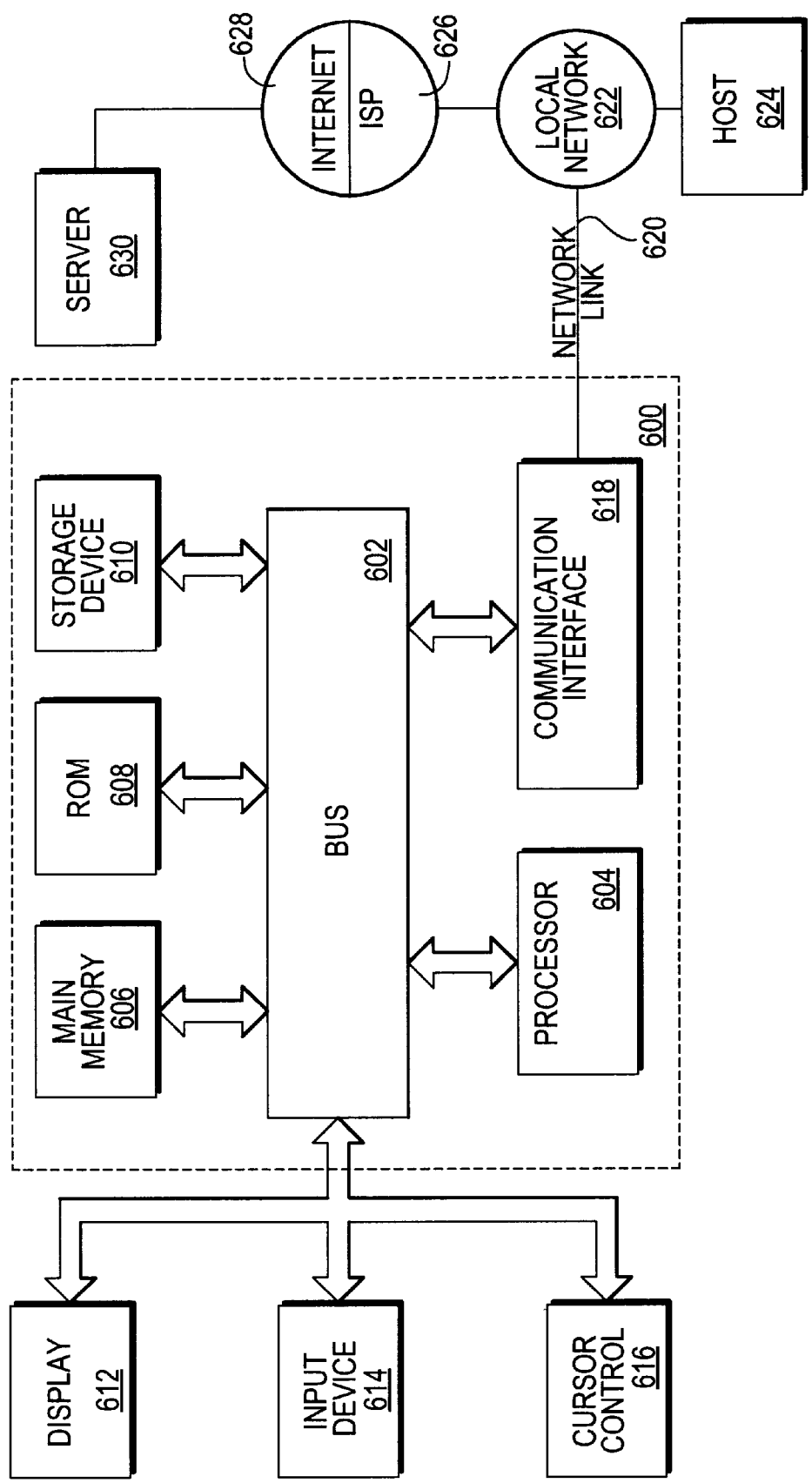
FIG. 6 is a diagram of a computer system that can be used with the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing autonomous transactions. According to one embodiment of the invention, managing autonomous transactions is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for managing autonomous transactions as described herein.

The received code may be executed by processor 604 as it is received, and/or stored in storage device 610, or other non-volatile storage for later execution. In this manner, computer system 600 may obtain application code in the form of a carrier wave.

EXTENSIONS AND ALTERNATIVES

Thus, a transaction processing mechanism has been described having significant advantages over past approaches. In particular, the embodiments described above provide autonomous transaction capability with minimal opportunity for programmer error. The embodiments can easily detect deadlock between an executing transaction and a transaction that is currently on the transaction stack. A sub-component does not need to know the transaction context of the calling application. Further, the calling application does not need to be aware of any autonomous transactions that the sub-component might perform.

The stack automatically keeps track of a nested sequence of autonomous transactions and thus eliminates a significant source of programming errors. In addition, whenever the currently executing transaction requests a resource that is held by a transaction that is on the transaction stack, the server can immediately detect and respond to a deadlock situation. The server response is facilitated because the server can determine, from the stack, that a transaction on the stack cannot resume execution until the currently executing transaction completes.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

As another example of an alternate embodiment, autonomous transactions are supported in a package application programming interface (API). When an autonomous transaction is created using the API, that transaction becomes the current transaction. As another alternative, an SQL primitive operation is defined that pushes autonomous transactions.

What is claimed is:

1. A method of executing an autonomous transaction in a computer program, the method comprising the steps of:
   executing operations of the program in a first transaction having a transaction context;
   calling an element of the program from the first transaction, the element having an autonomous transaction scope that is distinct from the first transaction;
   suspending the first transaction;
   executing operations of the element in one or more second transactions;
   exiting the element; and
   resuming execution of operations of the program in the first transaction.

2. The method recited in claim 1, in which the step of calling an element of the program from the first transaction comprises the steps of:

calling an autonomous block of the program from the first transaction, the autonomous block having a transactional scope that is distinct from the first transaction.

3. The method recited in claim 1, in which the step of calling an element of the program from the first transaction comprises the steps of:

calling an element of the program from the first transaction, in which the element is marked as autonomous and has a transactional scope that is distinct from the first transaction.

4. The method recited in claim 1, in which the step of executing operations of the element in one or more second transactions comprises the steps of:

executing operations of the element in one or more second transactions, wherein the second transactions are autonomous and have transactional contexts that are distinct from the first transaction.

5. The method recited in claim 1, in which the step of calling an element of the program from the first transaction comprises the steps of:

calling an element of the program from the first transaction, in which the element is marked as autonomous and has a transactional scope that is distinct from the first transaction; and in which the step of executing operations of the element comprises the steps of:

executing operations of the element in one or more autonomous transactions.

6. The method recited in claim 1, further comprising the steps of:

generating an error condition, when the element is exited normally, if at least one of the second transactions has neither committed nor rolled back.

7. The method recited in claim 6, further comprising the steps of:

when the error condition occurs, rolling back each of the second transactions that is active.

8. The method recited in claim 1, in which the step of suspending the first transaction includes the steps of pushing the transaction context of the first transaction onto a stack; and in which the step of resuming execution includes the steps of popping the transaction context of the first transaction from the stack.

9. A method of compiling a called program element that is marked as having an autonomous transaction scope distinct from that of a calling program element, the method comprising the steps of:

generating program code which, when executed by a processor, suspends a first transaction that is current when the called program element is called; and generating code which, when executed by the processor, restores the first transaction context before exiting the procedure.

10. The method recited in claim 9, further comprising the steps of:

generating an error condition, when the called program element is exited normally, if at least one transaction in the called program element has neither committed nor rolled back.

11. The method recited in claim 10, further comprising the steps of:

when the error condition occurs, rolling back each of the transactions that is active.

12. A method of associating a lexical scope of a computer program with an autonomous transaction scope, comprising the steps of:

(A) when the lexical scope is entered during execution of the program, storing a first transaction context of a current transaction on a stack of transaction context information that is accessible to the program during execution thereof;

(B) executing operations of the lexical scope in one or more autonomous transactions; and (C) after execution of the lexical scope, removing the first transaction context from the transaction stack and restoring the first transaction context as the current transaction context.

13. The method recited in claim 12, in which the current transaction is a nested transaction.

14. The method recited in claim 12, further comprising the step of:

(D) when the lexical scope is compiled, storing, in an executable version of the computer program, an instruction that signals the start of the autonomous scope.

15. The method recited in claim 14, further comprising the step of:

(E) when the instruction is executed, storing a marker bit in a runtime stack frame associated with the lexical scope.

16. A method of managing transactions in a transaction processing system, comprising the steps of:

(A) storing a stack comprising a plurality of entries, in which each entry stores information about a context of one of the transactions;

(B) marking an application program with one or more markers that signal the start of an autonomous lexical scope containing one or more transaction operations;

(C) when one of the markers is encountered when the application program is executing, storing context information about a first transaction in an entry of the stack; and (D) initiating one or more second transactions in which the transaction operations of the autonomous lexical scope are executed.

17. The method recited in claim 16, further comprising the step of:

(E) when execution of the autonomous lexical scope is complete, removing the context information about the first transaction from the stack and restoring the context information as the current transaction context.

18. The method recited in claim 16, in which the first transaction is among a plurality of nested transactions.

19. The method recited in claim 16, further comprising the steps of suspending the first transaction when the autonomous lexical scope is entered.

20. The method recited in claim 16, further comprising the step of recursively calling the autonomous lexical scope within the application program.

21. The method recited in claim 20, further comprising the steps of suspending the first transaction each time that the autonomous lexical scope is recursively called within the application program and executing the transaction operations of the autonomous lexical scope within the one or more second transactions.

22. A method of executing an autonomous transaction in a computer program, the method comprising the steps of:

storing a transaction stack in association with the computer program;

executing operations of the program in a first transaction;

suspending execution of the first transaction;

pushing a context associated with the first transaction onto the transaction stack;

executing further operations of the program in one or more second autonomous transactions;

popping the context of the first transaction from the stack; and resuming execution of the first transaction.

23. The method recited in claim 22, in which the step of storing a transaction stack comprises the steps of:

storing a transaction stack in association with the computer program, in which the transaction stack comprises one or more frames, each frame comprising transaction context information.

24. The method recited in claim 23, further comprising the steps of storing the transaction stack as a linked list of the frames.

25. The method recited in claim 22, further comprising the steps of storing the transaction stack in association with information describing a user session.

26. The method recited in claim 22, further comprising the steps of storing a plurality of transaction stacks in which each transaction stack is associated with a different user session.

27. A computer-readable medium carrying one or more sequences of instructions for executing an autonomous transaction in a computer program, wherein execution of the one or more sequences of instructions by one or more processors causes the one or more processors to perform the steps of:

executing operations of the program in a first transaction having a transaction context;

calling an element of the program from the first transaction, the element having an autonomous transaction scope that is distinct from the first transaction;

suspending the first transaction;

executing operations of the element in one or more second transactions;

exiting the element; and resuming execution of operations of the program in the first transaction.

28. A computer-readable medium carrying one or more sequences of instructions for executing an autonomous transaction in a computer program, wherein execution of the one or more sequences of instructions by one or more processors causes the one or more processors to perform the steps of:

storing a transaction stack in association with the computer program;

executing operations of the program in a first transaction;

suspending execution of the first transaction having a transaction context;

pushing the context of the first transaction onto the transaction stack;

executing further operations of the program in one or more second autonomous transactions;

popping the context of the first transaction from the stack; and resuming execution of the first transaction.

* * * * *